United States Patent

Päivinen

[11] Patent Number: 5,957,359
[45] Date of Patent: Sep. 28, 1999

[54] METHOD AND ARRANGEMENT FOR LEVELLING OUT THE TENSION OF OPTICAL FIBRES

[75] Inventor: Teuvo Päivinen, Lahela, Finland

[73] Assignee: NK Cables OY, Espoo, Finland

[21] Appl. No.: 08/981,579

[22] PCT Filed: Jul. 3, 1996

[86] PCT No.: PCT/FI96/00392

§ 371 Date: Mar. 24, 1998

§ 102(e) Date: Mar. 24, 1998

[87] PCT Pub. No.: WO97/02502

PCT Pub. Date: Jan. 23, 1997

[30] Foreign Application Priority Data

Jul. 6, 1995 [FI] Finland ..................... 953338

[51] Int. Cl.[6] ..................... B65H 20/00
[52] U.S. Cl. ................ 226/108; 242/418; 242/365.6; 242/920
[58] Field of Search ................ 226/108, 111, 226/174; 242/418, 365.6, 920

[56] References Cited

U.S. PATENT DOCUMENTS

| | | | |
|---|---|---|---|
| 2,160,495 | 5/1939 | Francis | 242/45 |
| 3,110,432 | 11/1963 | Smith | 226/108 |
| 3,132,786 | 5/1964 | Davidson | 226/111 |
| 3,620,481 | 11/1971 | Stewart | 242/203 |
| 3,901,455 | 8/1975 | Carlisle | 242/18 G |
| 4,049,168 | 9/1977 | Cole et al. | 226/40 |
| 4,050,639 | 9/1977 | Jackson | 242/18 G |

FOREIGN PATENT DOCUMENTS

| | | |
|---|---|---|
| 0235753 | 9/1987 | European Pat. Off. . |
| 0465656 | 1/1992 | European Pat. Off. . |
| 0534408 | 3/1993 | European Pat. Off. . |

*Primary Examiner*—Donald P. Walsh
*Assistant Examiner*—Minh-Chau Pham
*Attorney, Agent, or Firm*—Ladas & Parry

[57] ABSTRACT

A method and apparatus for equalizing the tension of optical fibers to a predetermined value, in which optical fibers (3) are passed from starting reels (1) through an equalizer wheel structure (4) to the next stage of the process. The equalizer wheel structure (4) is formed by two wheels (5, 6) on which the fibers (3) travel in succession. The first wheel (5) is adapted to supply fiber to the second wheel (6) at a greater rate than that which passes on the second wheel and is supplied to the next stage.

17 Claims, 1 Drawing Sheet

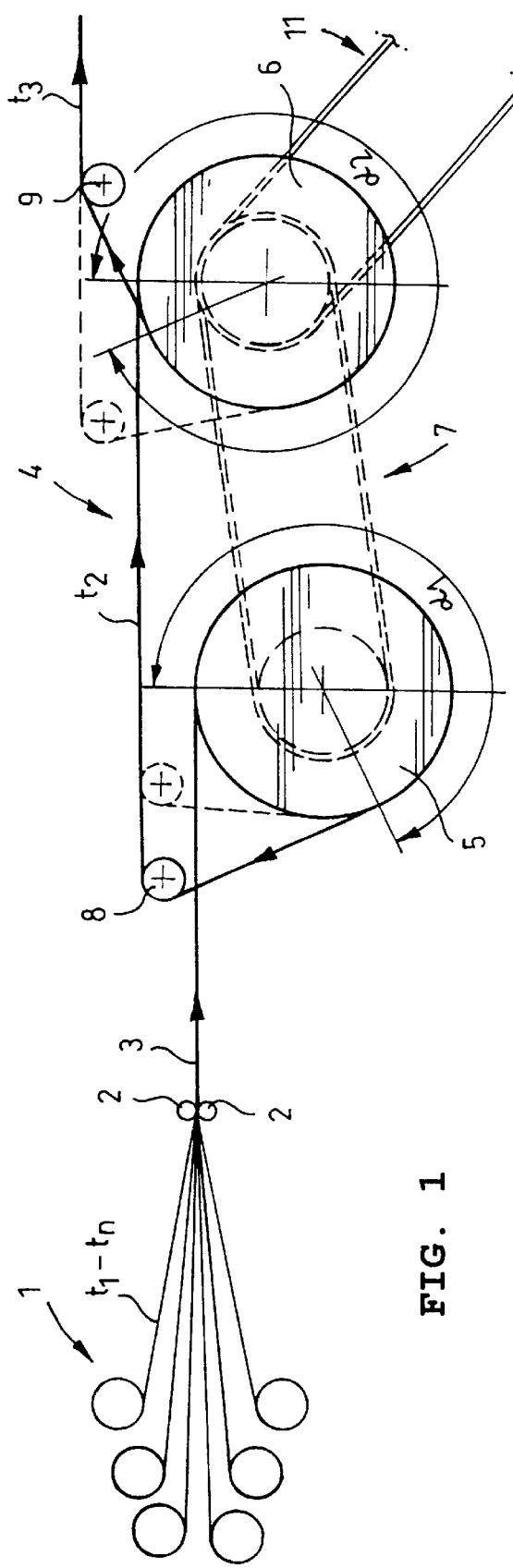
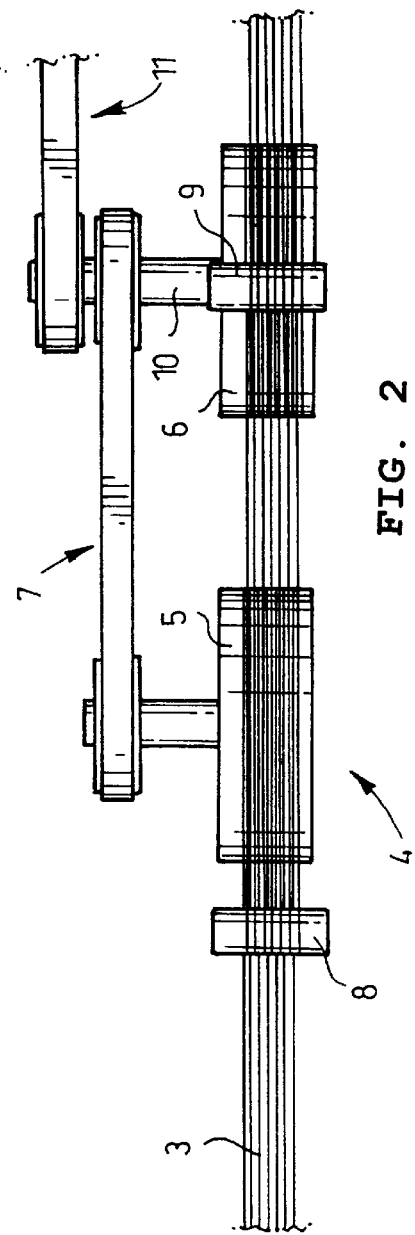
FIG. 1
FIG. 2

METHOD AND ARRANGEMENT FOR LEVELLING OUT THE TENSION OF OPTICAL FIBRES

FIELD OF THE INVENTION

The present invention relates to a method for levelling out the tension of optical fibres, in which method optical fibres are passed from starting reels through an equalizer wheel structure to the next stage of the process. The invention also relates to an arrangement for levelling out the tension of optical fibres.

BACKGROUND AND PRIOR ART

The forming of the tension of optical fibre and controlling it even in demanding production situations is essential in the production of a conductor element containing optical fibres, in the production of parts for a loose protective structure, for example, whether a so-called minitube or a so-called minitube ribbon or maxitube is being produced. A minitube refers to an element part of a multi-element stranded cable and a maxitube refers to a basic element of a single-element optical cable.

The requirements for a loose protective structure of the conductor element have changed recently and emphasis has been laid on both structure and production requirements. The filling gel is required to have a greater viscosity than before and thixotropy is required for tropical conditions, for example. The costs will raise production and structural requirements. This has caused technical problems to the realization of prior art solutions.

The solution disclosed in Finnish Patent Specification 85,310 can be mentioned as an example of prior art solutions. This solution is quite satisfactory for some situations, but a drawback is that the solution is only suitable for levelling out differences in fibre lengths. Tension differences of fibres cannot be levelled out with the solution.

German Offenlegungsschrift 41 14 299 can be mentioned as a second example of prior art solutions. A disadvantage of this solution is that it uses specific controlled starting reels, which makes it rather complicated to accomplish it in practice.

SUMMARY OF THE INVENTION

An object of the present invention is to provide a method and an arrangement by means of which the disadvantages of the prior art can be eliminated, that is, the object of the invention is to level out the tension of optical fibres, whether in a fibre bundle, a fibre bunch or fibre bunches, irrespective of moderately different tensions in the starting reels or problems caused by a high driving speed. This has been achieved with the method and arrangement according to the invention. The method according to the invention is characterized in that the equalizer wheel structure is formed of two wheels in sequence when viewed from the direction of movement of the fibres, of which wheels the first wheel is adapted to supply more fibre to the space between the wheels than what passes over the second wheel. The arrangement according to the invention is characterized in that the equalizer wheel structure is formed of two wheels in sequence when viewed from the direction of movement of the fibres, of which wheels the first wheel is adapted to supply more fibre to the space between the wheels than what passes over the second wheel.

An advantage of the invention is that the effect of initial tension can be eliminated completely. Starting carriages may always have the same settings that, as experience shows, do not change too much within a short period of time. A short period of time means here weeks or even months. The change in the discharge radius of fibre reels and/or the tension difference caused by small differences in the basic settings of the brakes in the starting axles is eliminated by means of the invention in a very simple way. Tension differences of about 100% can also be levelled out by means of the invention. The abovementioned factors will be of vital importance when considering the constant need for increasing the component density of fibres, which will raise the requirement for levelling out the length difference between fibres and the need for automating the control realization. The constant need for increasing driving speed can bring about the same requirements. The tension of fibres can also be elevated by means of the invention without any regard for the initial tensions. The apparatus even allows that the tension in the line is higher than the initial tension. As the performance of the axle in the control wheel of the apparatus is precise, it can easily be connected as an adjusting element to line automation. The extra length of fibre can thus be controlled easily in the secondary coating of both single fibre and fibre bundles.

BRIEF DESCRIPTION OF THE DRAWING

In the following, the invention will be explained in more detail by means of one preferred embodiment shown in the appended drawing, wherein FIG. 1 shows a schematic side view of the arrangement according to the invention, and FIG. 2 shows a top view of the arrangement of FIG. 1.

DETAILED DESCRIPTION

The figures show schematically one preferred embodiment of the arrangement according to the invention. Reference 1 indicates generally starting reel carriages of optical fibre with initial tension control devices. Reference numeral 2 in the figure shows guide wheels for guiding fibres 3 leaving the starting reels and passing to an equalizer wheel structure 4. The fibres 3 are guided from the starting reels through the equalizer wheel structure to the next stage of the process that may be an extruder head of an extruder, for example.

In accordance with the essential idea of the invention, the equalizer wheel structure 4 comprises two successive wheels 5, 6 viewed from the direction of movement of the fibres 3, of which wheels the first wheel 5 supplies more fibre to the space between the wheels than what passes over the second wheel 6, that is, the tension control wheel.

The basic idea discussed above can be realized in many different ways. In the example shown in the figures, the arrangement is based on different diameters of the wheels 5, 6. The diameter of the first wheel 5 is somewhat greater than that of the second wheel 6. The term 'somewhat greater' here means that the diameter of the first wheel 5 is several mils greater than the diameter of the second wheel 6. The wheels 5, 6 are connected to each other by means of a positive transmission mechanism 7 with a transmission rate 1:1. For example, a toothed belt mechanism can act as the transmission mechanism 7. Positive transmission means that when one wheel is rotated, the other wheel also rotates by means of the transmission mechanism 7. Reference numeral 11 in the figures indicates a power transmission mechanism, such as a toothed belt mechanism between a driving motor and the second wheel 6. The driving motor is not shown in the figures.

In the example of the figures, the arrangement further comprises auxiliary wheels 8,9 mounted transferably by means of which wheels contact angles $\alpha_1$ and $\alpha_2$ of the fibres can be adjusted. In the examples of the figure, the fibres have been threaded through auxiliary wheels 8, 9 positioned at predetermined places in such a manner that the contact angle $\alpha_2$ of the fibres on the wheel 6 is greater than the contact angle $\alpha_1$ of the fibres on the wheel 5. The object of this arrangement is to accomplish a differing contact for the friction surface when the fibres touch the wheels. A corresponding effect can also be attained by wheels with different friction coefficients.

The arrangement according to the figures in principle works in the following way. The fibres 3 enter the equalizer wheel structure formed by the wheels 5, 6 with starting reel tensions $t_1$ to $t_n$. When the fibres are drawn out from the system of wheels with the tension $t_3$, it causes a rotating movement to the system of wheels. When the wheel 6 has a greater fibre contact angle than the wheel 5, the fibres attach better to the wheel 6. When the fibres are constantly drawn with the tension $t_3$, this action forces the wheel 6 to rotate and the rotation of the wheel 6 further forces the wheel 5 to rotate by means of the transmission mechanism 7. When the diameter of the wheel 5 is greater than the diameter of the wheel 6, its peripheral speed is also greater because of positively driven operation, whereby the wheel 5 supplies more length of fibre to the space between the wheels 5, 6 than the length of fibre which passes over the wheel 6. This causes the tension $t_2$ to fall close to zero for all the fibres and to slide partially backwards over the wheel 5. Thus the tensions of the fibres are levelled out, which is followed by the fibres passing over the wheel 6 with the same tension, whereby relatively they are of the exactly same size also in the protective structure to be driven at the next stage of the process.

The adjustment of the tension $t_3$ of fibres can also be carried out with the arrangement according to the figures. When a driving unit is connected to the axle 10 of the apparatus, the driving unit being a servo unit, for example, either as an assisting or a braking device, the tension $t_3$ will also be adjusted. In this way, the tension $t_3$ is not dependent on the tension $t_1$ to $t_n$ as the tension equalizer apparatus levels out and in a way sets to zero all previous tensions by means of the tension $t_2$. As the total of the tensions $t_3$ needed for realizing production parameters are always greater than the total of the tensions $t_1$ to $t_n$, only the tension amount is elevated. This can be realized easily and accurately when the driving unit mentioned above is connected to the speed point of the production line. In this way, fibres are provided with accurate tension adjustment independent of tensions caused by starting arrangements, which allows the extra length of fibre between the first and second wheels to be adjusted automatically.

The embodiment presented above is in no way intended to restrict the invention, but the invention may be modified fully freely within the scope of the claims. Therefore it is evident that the arrangement according to the invention or its details do not necessarily have to be identical to those shown in the figure but other solutions are possible as well.

What is claimed is:

1. A method of establishing a determined and equalized tension in a plurality of optical fibres drawn from starting reels and delivered to a subsequent stage of operation, said method comprising:

passing a plurality of optical fibres from the starting reels through an equalizing wheel structure in which differences in tension in the respective optical fibres are eliminated and the optical fibres are all subjected to the same determined tension and are delivered at the same determined tension to a subsequent stage of operation, forming the equalizing wheel structure as first and second wheels on which the optical fibres travel in succession, and controlling delivery of said optical fibres from said first and second wheels to cause the optical fibres to be delivered from said first wheel at a linear rate greater than a linear rate of the optical fibres delivered from the second wheel.

2. A method as claimed in claim 1, in which the optical fibres travel in succession on said first and second wheels by passing on said first and second wheels on a respective portion of the periphery of said wheels.

3. A method as claimed in claim 2, wherein the fibres pass on a smaller portion of the periphery of the first wheel than on the periphery of the second wheel.

4. A method as claimed in claim 2, wherein the linear rate of delivery of the optical fibres from the first wheel is made greater than from said second wheel by providing said first wheel with a larger diameter than said second wheel and by rotating said first and second wheels at the same angular speed.

5. A method as claimed in claim 2, comprising connecting said first and second wheels for rotating at the same angular speed.

6. A method as claimed in claim 5, comprising driving the second wheel in rotation from an external source.

7. A method as claimed in claim 2, comprising adjusting the respective portions of the periphery of the wheels on which the optical fibres pass.

8. A method as claimed in claim 1, wherein the greater linear rate of optical fibres delivered from the first wheel is effective for producing substantial reduction of tension in the optical fibres when said fibres leave said first wheel.

9. A method as claimed in claim 1, wherein differences in tension in the plurality of fibres are eliminated upon delivery of said plurality of fibres from said first wheel by substantially reducing the tension in the plurality of fibres to zero whereafter the second wheel imparts the predetermined tension to all of the plurality of fibres now delivered thereto.

10. Apparatus for equalizing tension to a predetermined value in a plurality of optical fibres drawn from starting reels and delivered to a subsequent stage of operation, said apparatus comprising an equalizer wheel structure including first and second wheels on which the optical fibres pass in sequence in traveling from said starting reels to the subsequent stage of operation, said first and second wheels being constructed and arranged so that said first wheel delivers the optical fibres to said second wheel at a linear rate greater than a linear rate of the optical fibres delivered from the second wheel to said subsequent stage to cause differences in tension in the plurality of optical fibres to be first eliminated and then the tension in the plurality of optical fibres is equalized to said Predetermined value.

11. An apparatus as claimed in claim 10, comprising means connecting said first and second wheels for angular rotation at the same speed, said first wheel having a diameter greater than said second wheel whereby the first wheel has a peripheral speed greater than said second wheel.

12. An apparatus as claimed in claim 10, wherein the first and second wheels have equal diameters, said first wheel being rotatable at a greater angular velocity than said second wheel.

13. An apparatus as claimed in claim 10, comprising auxiliary wheels on which said optical fibres pass, said auxiliary wheels being adjustable to control a contact angle of said optical fibres on said first and second wheels.

14. An apparatus as claimed in claim 10, wherein said first and second wheels have respective frictional surfaces on which said optical fibres are in contact, said frictional surfaces having different coefficients of friction to produce the different linear rates of delivery of the optical fibres from the first and second wheels.

15. An apparatus as claimed in claim 14, comprising means connecting said first and second wheels for angular rotation at the same speed.

16. An apparatus as claimed in claim 10, comprising means connected to said second wheel to apply force thereto for controlling angular rotation of said second wheel.

17. An apparatus as claimed in claim 10, wherein said first wheel delivers said plurality of fibres therefrom substantially at zero tension thereby eliminating tension differences between the plurality of fibres delivered from said starting reels, said second wheel imparting said predetermined tension to all of said plurality of fibres equally for delivery to said subsequent stage.

* * * * *